(12) United States Patent
Jackson et al.

(10) Patent No.: US 8,495,946 B2
(45) Date of Patent: Jul. 30, 2013

(54) CAMOUFLAGE UTILIZING NANO-OPTICAL ARRAYS EMBEDDED IN CARBON MATRIX

(75) Inventors: Michael J. Jackson, Collingswood, NJ (US); Daniel Spooner, Marlton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 188 days.

(21) Appl. No.: 13/162,393

(22) Filed: Jun. 16, 2011

(65) Prior Publication Data

US 2012/0318129 A1    Dec. 20, 2012

(51) Int. Cl.
*F41H 3/02* (2006.01)
*B82Y 20/00* (2011.01)

(52) U.S. Cl.
USPC ............ 89/36.02; 89/902; 977/950; 977/742; 428/911; 109/49.5

(58) Field of Classification Search
USPC .. 89/36.02; 977/950, 742; 428/911; 109/49.5
See application file for complete search history.

(56) References Cited

U.S. PATENT DOCUMENTS

| | | | |
|---|---|---|---|
| 4,621,012 A | 11/1986 | Pusch | |
| 5,307,162 A | 4/1994 | Schowengerdt | |
| 5,684,887 A | 11/1997 | Lee et al. | |
| 6,127,007 A | 10/2000 | Cox et al. | |
| 6,333,726 B1 | 12/2001 | Bettinger | |
| 6,459,076 B1 | 10/2002 | Schlenker | |
| 6,927,724 B2 | 8/2005 | Snaper | |
| 7,132,635 B2 | 11/2006 | Dowling | |
| 7,199,344 B2 | 4/2007 | Blake | |
| 7,215,275 B2 | 5/2007 | Dumas | |
| 7,345,616 B2 | 3/2008 | Williams | |
| 7,354,877 B2 * | 4/2008 | Rosenberger et al. | 442/194 |
| 7,834,527 B2 | 11/2010 | Alvarez Icaza Rivera et al. | |
| 8,080,487 B2 * | 12/2011 | Gardner et al. | 442/189 |
| 8,188,452 B2 * | 5/2012 | Slinkard et al. | 250/516.1 |
| 8,203,129 B2 * | 6/2012 | Slinkard et al. | 250/516.1 |
| 8,212,229 B2 * | 7/2012 | Slinkard et al. | 250/516.1 |
| 2004/0213982 A1 | 10/2004 | Touzov | |
| 2005/0095938 A1 * | 5/2005 | Rosenberger et al. | 442/194 |
| 2007/0108068 A1 * | 5/2007 | Suh et al. | 205/766 |
| 2007/0153353 A1 | 7/2007 | Gruner | |
| 2009/0263644 A1 | 10/2009 | Kelsey et al. | |
| 2010/0288116 A1 | 11/2010 | Cincotti et al. | |
| 2011/0057127 A1 * | 3/2011 | Slinkard et al. | 250/505.1 |
| 2011/0072550 A1 * | 3/2011 | Slinkard et al. | 2/69 |
| 2011/0073361 A1 * | 3/2011 | Slinkard et al. | 174/388 |
| 2011/0079257 A1 * | 4/2011 | Slinkard et al. | 135/96 |
| 2011/0192354 A1 * | 8/2011 | Slinkard et al. | 119/712 |
| 2012/0273699 A1 * | 11/2012 | Slinkard et al. | 250/519.1 |

FOREIGN PATENT DOCUMENTS

DE    102005044404 A1    3/2007

OTHER PUBLICATIONS

Singh et al. "Applications and Future of Nanotechnology In Textiles", 2006 Beltwide Cotton Conferences, San Antonio, Texas, Jan. 3-6, 2006. pp. 2497-2503.

* cited by examiner

*Primary Examiner* — Michael David
(74) *Attorney, Agent, or Firm* — Howard IP Law Group, P.C.

(57) ABSTRACT

A camouflage material comprising an electromagnetic energy (EME) absorbing layer comprising an array of carbon nanotubes and a plurality of energy transmitting elements embedded within the absorbing material. The energy transmitting elements are operative to convey energy to at least a portion of an outer surface of the absorbing layer.

22 Claims, 10 Drawing Sheets

CAMOUFLAGE UTILIZING NANO-OPTICAL ARRAYS EMBEDDED IN CARBON MATRIX

FIELD OF THE INVENTION

The present invention relates to camouflage systems, more specifically, to active and passive camouflage systems utilizing carbon-based electromagnetic (EM) energy absorbent materials.

BACKGROUND

Effective camouflage and stealth systems may be critical to the success of military operations, allowing for the covert deployment of personnel, vehicles, equipment, and cargo into the field. Conventional passive optical camouflage (i.e. camouflage in the visible spectrum) consists of placing onto an asset one or more surface color and/or texture schemes selected to match an anticipated operating environment. These schemes may include patterns to match, for example, sky, desert, forest, oceanic, urban settings or other non-specific digital schemes. However, in the field, each environment or theater of operation requires a unique scheme, which may include a pattern that changes over time. Moreover, within these environments, unpredictable variations in the actual background limit the effectiveness of these static scheme camouflage systems.

In order to remedy these shortcomings, existing active camouflage systems utilize image-capturing and display equipment to recreate a captured background image onto a selected surface of an asset, thereby providing a camouflage effect. However, these systems, in addition to being complex and bulky, provide only single-spectrum protection (i.e. optical camouflage), while modern detection equipment may utilize infrared (IR) and radio-frequency (RF) band EM energy to detect potential targets. Alternative systems and methods are desired.

SUMMARY

According to embodiments of the present invention, active and passive camouflage systems are provided which not only provide real-time scheme changes, but further, offer detection prevention across multiple energy spectrums while reducing system size and weight. Embodiments of the present invention include active and passive camouflage systems which utilize light-transmitting elements, such as optical fibers, embedded in a highly-absorbent material, such as a material formed from carbon nanotubes (CNTs). The CNT material acts as a "super-dark" backing surface that can absorb, by way of example only, visual, IR and/or RF energy, reducing the effective range at which an observer and/or detection system may identify the camouflaged asset, or eliminating the ability to detect the asset entirely.

In one embodiment of the present invention, a passive camouflage system is provided including at least one optical array embedded in a super-dark CNT-based material. The optical array comprises a plurality of optical fibers configured to receive and transmit EM energy from one portion of the surface of the camouflaged object to another.

In another embodiment of the present invention, an active camouflage system is provided comprising an optical array embedded in a CNT-based super-dark absorbent material. A plurality of light-emitting devices are arranged in communication with the optical array and are operatively connected to a control system configured to re-create a desired image on a surface of the camouflaged object.

Embodiments of the present invention also include a method of camouflaging an object. The method comprises capturing at least one of a portion of light, infrared, and radio-frequency energy exposed to a surface of an object to be camouflaged. Another portion of light, infrared, and radio-frequency energy exposed to the surface of the object is absorbed in a CNT-based material arranged thereon. The captured energy, or an energy signature representative of the captured energy, is projected onto another portion of the outer surface of the object.

DETAILED DESCRIPTION

Figure 1:
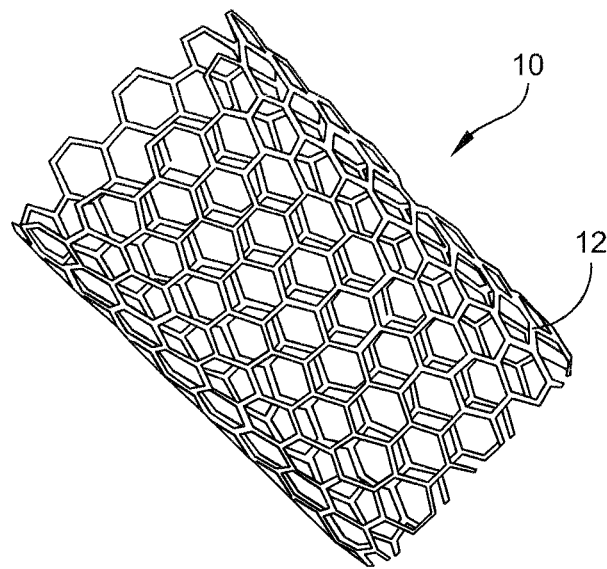
FIG. 1 is a perspective view of a single-walled CNT.

It is to be understood that the figures and descriptions of the present invention have been simplified to illustrate elements that are relevant for a clear understanding of the present invention, while eliminating, for purposes of clarity, many other elements found in typical camouflage systems and/or video and display systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Advances in the fields of computer graphics and optics, as well as in composite and nano-fabricated materials may be used to improve the stealth capability of modern combat systems and equipment. In particular, these technologies may be integrated into camouflage systems to provide concealment over a broad range of the EM spectrum, including medium wavelength ultraviolet (UV), visible and IR light, and short wavelength emissions, such as RF transmissions used in today's radar systems.

Embodiments of the present invention include both active and passive camouflage systems which utilize EM energy transmitting elements, such as optical fibers and/or LEDs, embedded in a highly-absorbent backing material, for example, a CNT-based material. The CNT material acts as a super-dark absorber of, by way of example only, visual, IR and/or RF energy, reducing the effective range at which an observer and/or detection system may identify the camouflaged asset.

Referring generally to FIG. 1, a representative model of a single-walled CNT 10 is shown. CNTs are allotropes of carbon with a cylindrical nanostructure 12. Certain CNT configurations possess advantageous physical properties, including very high strength and a high emissivity or absorbance.

Emissivity is defined as the ratio of the energy radiated by an object compared to that of a black body. A black body is a theoretical material that absorbs all incident light (no light reflected or transmitted), at all wavelengths. Therefore, a hypothetical black body would possess an emissivity of one (1) for all wavelengths. This theoretical behavior has not been observed in any known material, as all materials necessarily reflect some portion of the EM spectrum resulting from their structure and/or composition. Materials possessing emissivity levels nearing those of true black bodies have many applications, including use in camouflage systems according to embodiments of the present invention.

Figure 2:
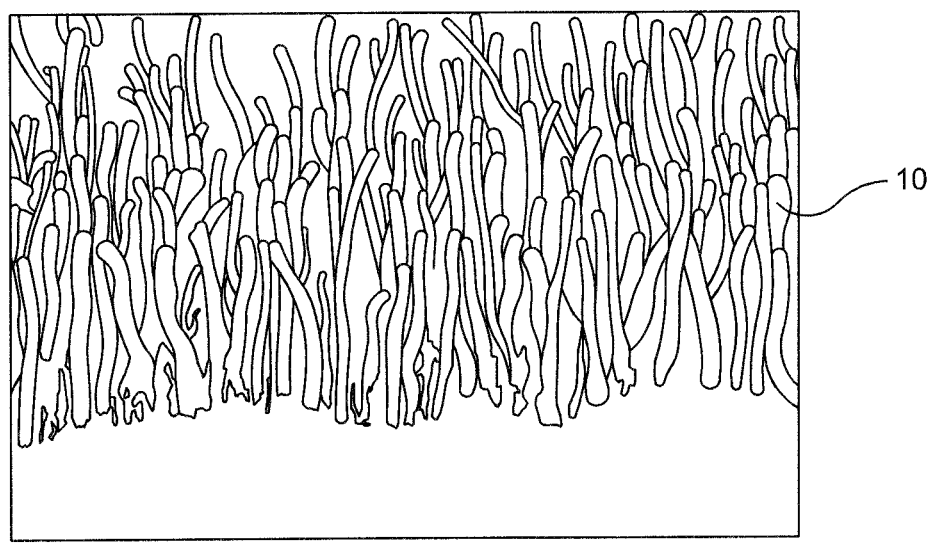
FIG. 2 is a perspective view of a forest of vertically-aligned CNTs.

Referring generally to FIG. 2, CNTs 10 arranged in vertical aligned clusters or "forests" feature emissivity characteristics near to that of a theoretical black body. In some configurations, these CNT forests can have an absorbance of 0.98-0.99 from the far-ultraviolet spectrum (200 nanometers (nm)), to far-infrared spectrum (200 micrometers (um)). This emissivity is significantly higher than conventional "black" materials (e.g. super-dark coatings and paints). Furthermore, in contrast to conventional absorbent materials, the emissivity of a CNT forest may be nearly wavelength-independent across a wide spectral range.

This forest structure may provide additional benefits over other forms of CNTs, such as roll-pressed sheets, buckypaper, and other films. Specifically, the black body-like behavior of a CNT forest originates from several of its characteristics, including its material density (in this case its sparseness), as well as the alignment of the nanotubes themselves.

Figure 3:
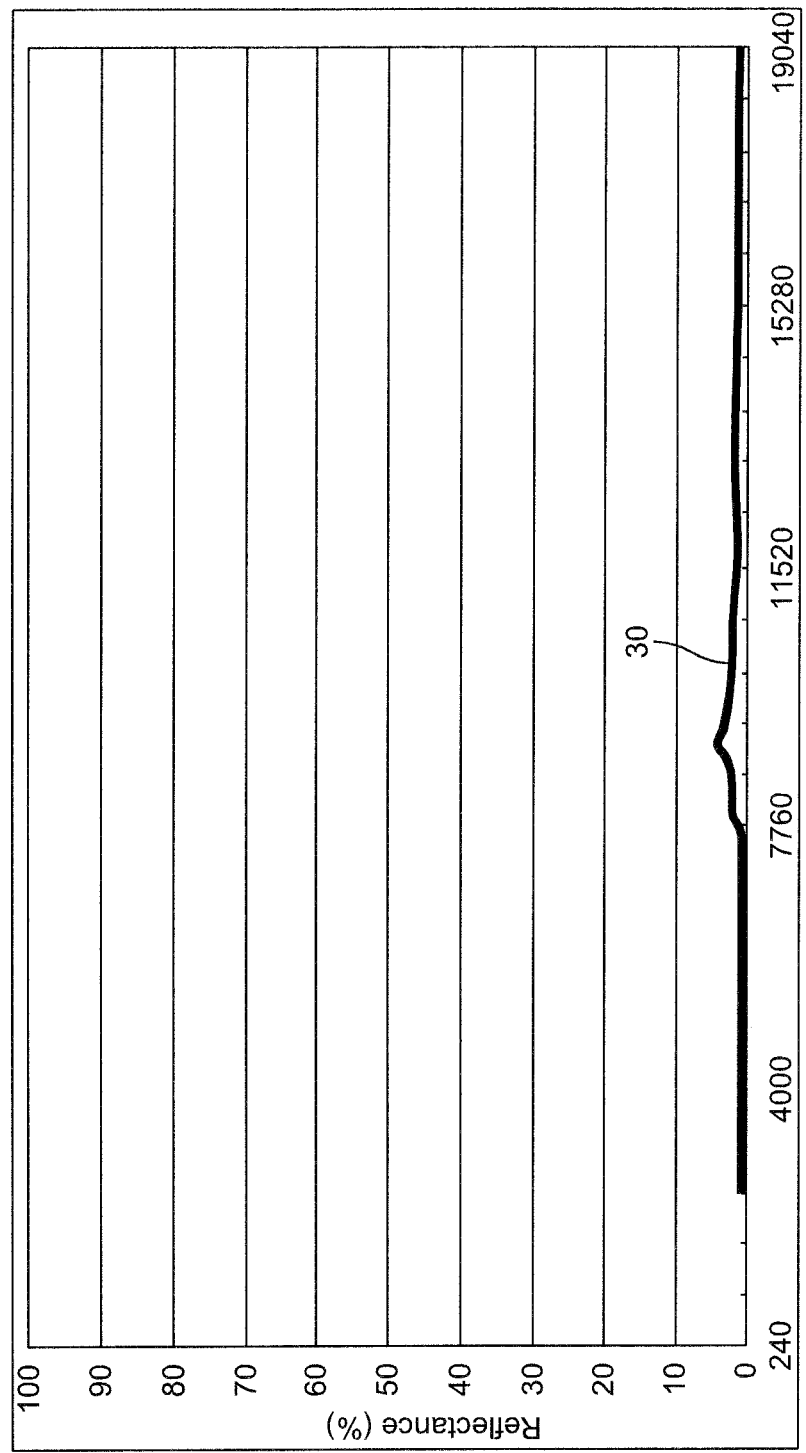
FIG. 3 is a graphical representation of the absorption characteristics of a CNT forest over a selected frequency range.

In general, light may be reflected, transmitted, or absorbed by a material. The low-density characteristic of the CNT acts to suppress reflection. According to Fresnel's law, reflection is reduced when the refractive index of an object is close to that of air. While this is difficult to achieve from a solid, or high-density material, materials with lower material density, such as the aerogel-like CNT forest, offer decreased permissivity over solid materials. Because the permissivity is proportional to the square of the refractive index, a decrease in permissivity results in a decrease of the refractive index, and thus a drop in reflectance. FIG. 3 is a graphical representation of the reflectance 30 of a CNT forest measured over a portion of the visible spectrum. As illustrated, over most wavelengths, the CNT material comprises an extremely low reflectance, mimicking the behavior of a theoretical black body. In one embodiment of the present invention, the CNTs making up the forest may represent, for example, 2-5% of the total volume of the material, with the remaining portion comprising, for example, air.

In addition to homogeneous sparseness, tube alignment within the CNT forest (FIG. 2) may also play a role in achieving black body behavior. CNTs which are vertically aligned perpendicular to a base substrate generally take on an angle of up to approximately twenty degrees (20°) with respect to orthogonal. Because CNTs are good absorbers over much of the EM spectrum, and this angle of tilt is relatively small, significant reflection is unlikely, and light is generally absorbed as it propagates further into the material.

Figure 4:
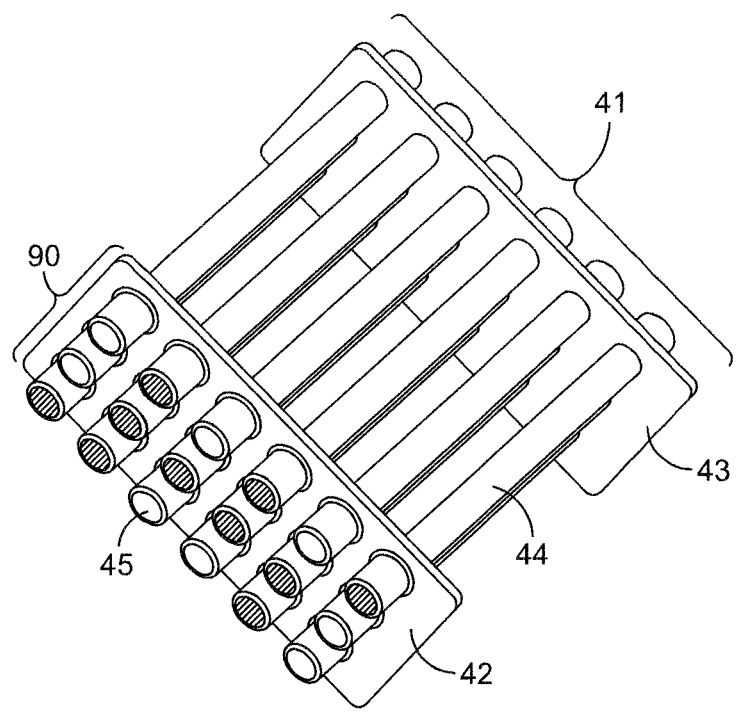
FIG. 4 is a perspective view of a portion of a passive camouflage system according to an embodiment of the present invention.
Figure 5:
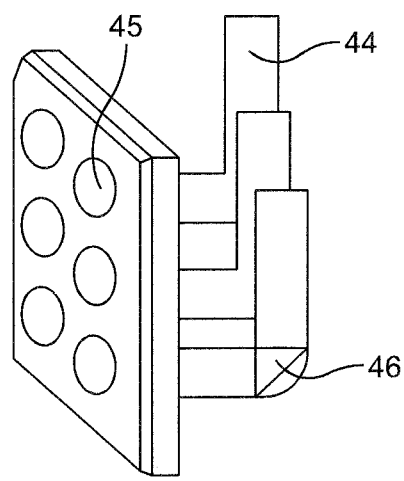
FIG. 5 is a perspective view of a portion of a passive camouflage system according to an embodiment of the present invention.

CNT-based structures may be advantageously utilized in both active and passive camouflage systems as a result of these properties. With reference to FIGS. 4 and 5, representative material segments of a passive camouflage system according to an embodiment of the present invention are shown. The term "passive system" is used to describe a camouflage system that does not require outside input (e.g. power, data, or operator input) to function beyond the presence of background or ambient EM energy (e.g. light).

Referring generally to FIG. 4, a simplified segment of a passive camouflage system according to an embodiment of the present invention is provided. The illustrated system includes optical arrays 40,41 embedded within respective backing material segments 42,43. In one embodiment of the present invention, material segments 42,43 comprise energy/e.g. visible light, RF. IR) absorbent materials such as the above-described single-walled CNT forests. In application, material segments 42,43 may represent the exposed outer surface of an asset to be camouflaged, for example, the outer layer of a garment, or the outer surface of a vehicle. The super-dark CNT-based absorber 42,43 segments limit the reflection and/or refraction of any light exposed thereto, as well as absorb other bands of the EM spectrum, such as UV and RF radiation.

Still referring to FIG. 4, optical arrays 40,41 may comprise, for example, respective first and second ends of a plurality of optical fibers 44, or other transmission elements capable of acting as light and/or RF "tubes". In this way, a "one-to-one" optical arrangement is created between arrays 40,41. Optical arrays 40,41 are operative to receive visible light (or other EM radiation) and "pass" the light from one side of the system to the other (i.e. from one array to the other). Thus, an image collectively received by array 40 on first segment 42 will be transferred and re-created by array 41 on second segment 43, while any light and/or EM energy not collected by array 40 will be absorbed by the CNT-based backing material comprising segment 42. In one embodiment, respective first and second absorber material segments 42,43 and arrays 40,41 may be arranged on opposite sides of an asset to be camouflaged. In this way, the asset, or portion thereof between segments 42,43 is effectively rendered invisible.

Figure 6:
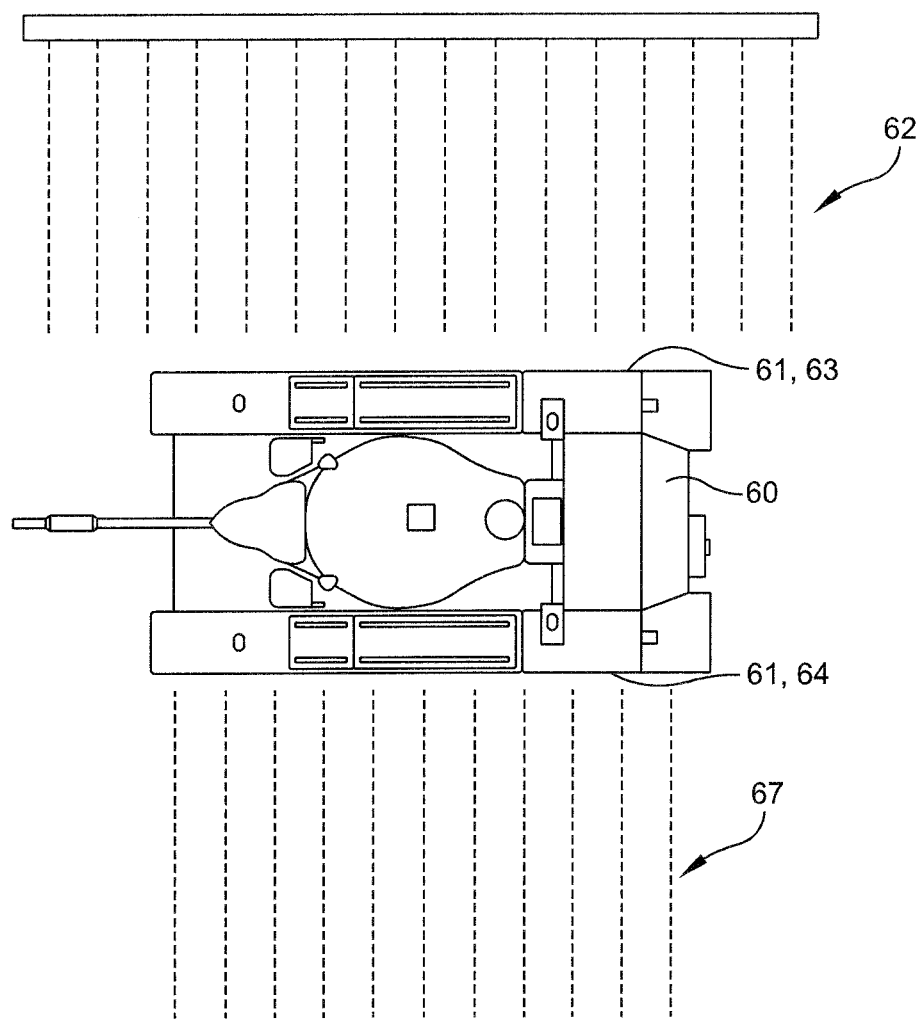
FIG. 6 is an overhead view illustrating the function of a passive camouflage system according to an embodiment of the present invention.
Figure 7:
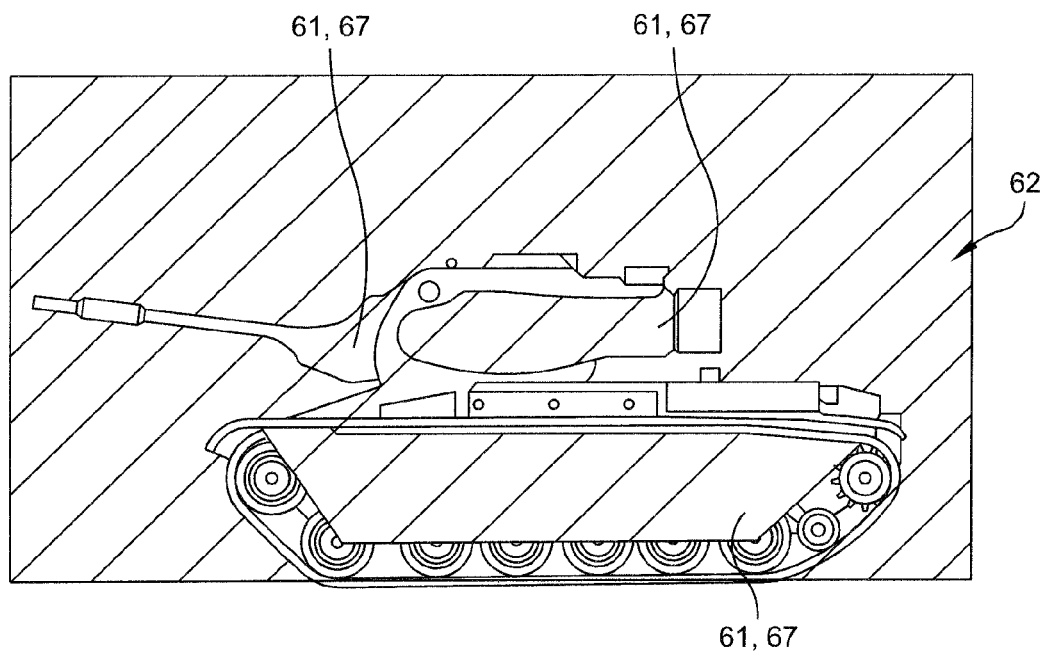
FIG. 7 is a side view illustrating the function of a passive and/or active camouflage system according to embodiments of the present invention.

This effect is illustrated in FIGS. 6 and 7 wherein a representative asset 60 having portions 61 of its outer surface fitted with a passive camouflage system according to embodiments of the present invention. Ambient light or background light 62 may be received by, for example, an array of optical fibers 63 arranged on a first side of asset 60 opposite an observer. This light is received, transmitted around (or through) asset 60, and projected by an optical array 64 arranged on a side of asset 60 opposite array 63. An observer may sense this passed light as image 67.

As set forth above with respect to FIG. 4, the ends of each optical fiber 44 forming passive array 40,41 may be arranged on generally opposite sides of an asset to be camouflaged. In this way, a fully-covered asset features an optical array that can be described as radially arranged around its outer surface, creating 360 degrees (360°) of camouflage protection. In other embodiments, including those utilizing arrays other than the one-to-one optical array shown and described herein, any number of arrays and fiber arrangements may be utilized to provide any amount of asset coverage and/or desired optical effects.

Optical fibers 44 may be formed in the nano-scale (i.e. optical/photonic nanowires formed from, for example, silica fibers) within backing material 42,43 and/or may comprise more conventionally-sized fibers suitable for transmitting at least one of visible, IR, and UV energy. In an alternate embodiment of the present invention, multiple types of fibers or transmission elements may be used to transmit portions of the EM spectrum between respective sides of backing material 42,43. For example, distinct fibers optimally sized and/or configured for respective portions of the EM spectrum could be utilized simultaneously. This configuration may be used to enhance the multi-spectral performance of the system.

In another embodiment of the present invention, fiber-optic lenses may be used (e.g. embedded on or within absorber 42,43) in communication with the ends of optical fibers 44. The lenses may be operative to aid in both receiving and transmitting EM energy. This arrangement is shown in FIGS. 4 and 5, wherein CNT absorber segments 42,43 comprises a plurality of fiber-optic lenses 45 connected to respective optical fibers 44. In one embodiment, lenses 45 may comprise the ground and/or polished ends of optical fibers 44.

Figure 8:
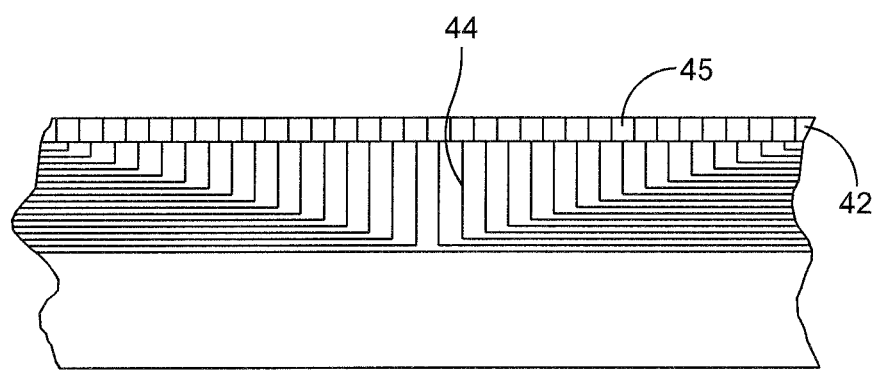
FIG. 8 is a cross-sectional view of a portion of a passive and/or active camouflage system according to an embodiment of the present invention.

In the illustrated embodiment of FIG. 5, one or more prisms 46 may be arranged within optical fibers or light tubes 44 and associated with an individual fiber optic lens 45. Prism 46 may be operative to, for example, redirect light and/or RF energy at extreme angles. In this way, a system having a low-profile (i.e. a low overall height) may be achieved by allowing for a reduction in the bend radii of fibers 44 compared to what would otherwise be achievable. This embodiment may be especially advantageous in personnel and/or aircraft camouflage systems wherein low-profile and low-bulk characteristics may be of increased importance. With respect to wearable garments, optical fibers 44 may be "wrapped" around the garment, so as to provide EM energy-transmitting paths from all points on the garment to a corresponding point located generally opposite thereof. This arrangement is partially illustrated in FIG. 8. It is further envisioned that embodiments of the present invention may include woven or otherwise intertwined optical fibers forming the fabric layer of the garment, further reducing weight and material thickness. In other embodiments, the material may be fitted onto or over, for example, all or part of an exterior surface of a military vehicle as depicted in FIG. 7.

While exemplary embodiments of a system have been shown in the figures for purposes of clarity, it should be understood that embodiments of the present invention may comprise any number of these segments joined together, or a single, continuous material layer and/or optical array covering all or part of an asset. Embodiments of the present invention may be attached to an asset by any suitable means, such as adhesives, and/or mechanical fasteners.

While the above embodiments have been described as "passive", requiring virtually no outside input for the system to function, it is further envisioned that these arrangements may be augmented with control systems. In one such embodiment, the control system may comprise, for example, a processing system responsive to an operator input and configured to allow for the selective (e.g. on/off) control of any or all of the optical arrays, or portions thereof. Additional embodiments may provide for directional control of the transmitted energy through the array. Specifically, a control processor may be operative to pass received energy to any desired array, or portion thereof, located on the surface of the camouflaged asset, rather than only to a portion located, for example, opposite the receiving array in the above-described one-to-one array arrangement.

The above-described embodiments provide several benefits over existing camouflage systems. As the fiber optic filaments channel surrounding light/images toward the observer regardless of environment, there is no need to provide alternative camouflage coverings for protection in the visual light spectrum. Moreover, in dark environments the super-dark CNT material is an effective light and heat absorber, making detection in both the visual and IR ranges more difficult. This passive camouflage can be much more effective against enemies who rely mainly upon visual detection for firing, for example, rocket-propelled grenades (RPGs) and shoulder-launched missiles. Further, the fiber optics' ability to channel RF energy away from the asset, along with the super-dark absorption characteristics of the CNTs make search radars less effective and reduce the range of fire control radar lock-on, providing aircraft, in particular, with a higher probability of mission success.

Referring generally to FIGS. 9-12, active camouflage systems according to embodiments of the present invention are shown and described. "Active" camouflage systems as described herein include systems configured to alter their outward appearance depending on current and/or predicted environmental conditions. For example, a vehicle operating in a desert during daylight may wish to project a similar environment onto one or more of its faces. This may be achieved by capturing and re-creating (e.g. projecting) the surrounding environment on its surface in real-time, or by re-creating a predetermined environmental scheme, for example, a generic or previously-recorded scheme stored in the system's memory.

Figure 9:
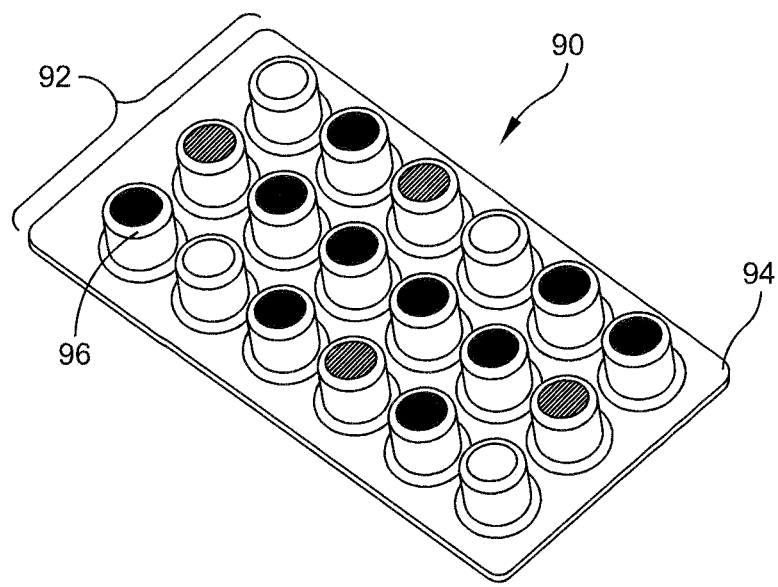
FIG. 9 is a perspective view of a portion of an active camouflage system according to an embodiment of the present invention.

As set forth above with respect to the passive systems of FIGS. 4-8, embodiments of the active system include an outward facing composite material (segment 90 of which is shown in FIG. 9) comprising an optical array 92 embedded within an absorbent backing material 94. In one embodiment of the present invention, optical array 92 may comprise the first ends of a plurality of optical fibers, as described above with respect to the passive embodiments. Respective second ends of the fibers comprising array 92 may be operatively connected to, for example, at least one light source, for example, a plurality of light-emitting diodes (LEDs) located remotely from the surface of the object to be camouflaged. In one embodiment, the at least one light source may be co-located with a control system, the details of which will be set forth below with respect to FIG. 12. In one embodiment of the present invention, any two or more light sources may be configured to generate light of a different color (e.g. red, green, blue).

In another embodiment of the present invention, optical array 92 may comprise at least one light-emitting source, for example, a plurality of LEDs 96 arranged on or within the absorbent backing material 94. In this embodiment, LEDs 96 may be operatively connected to the controller system via nano-scale connections. For example, metallic (e.g. nickel, platinum, or gold) nanowires may be formed or arranged within the CNT backing material, or in a separate material layer, without the need for optical fibers. In other embodiments, the electrical connections may comprise more conventionally-sized conductive wiring.

Figure 12:
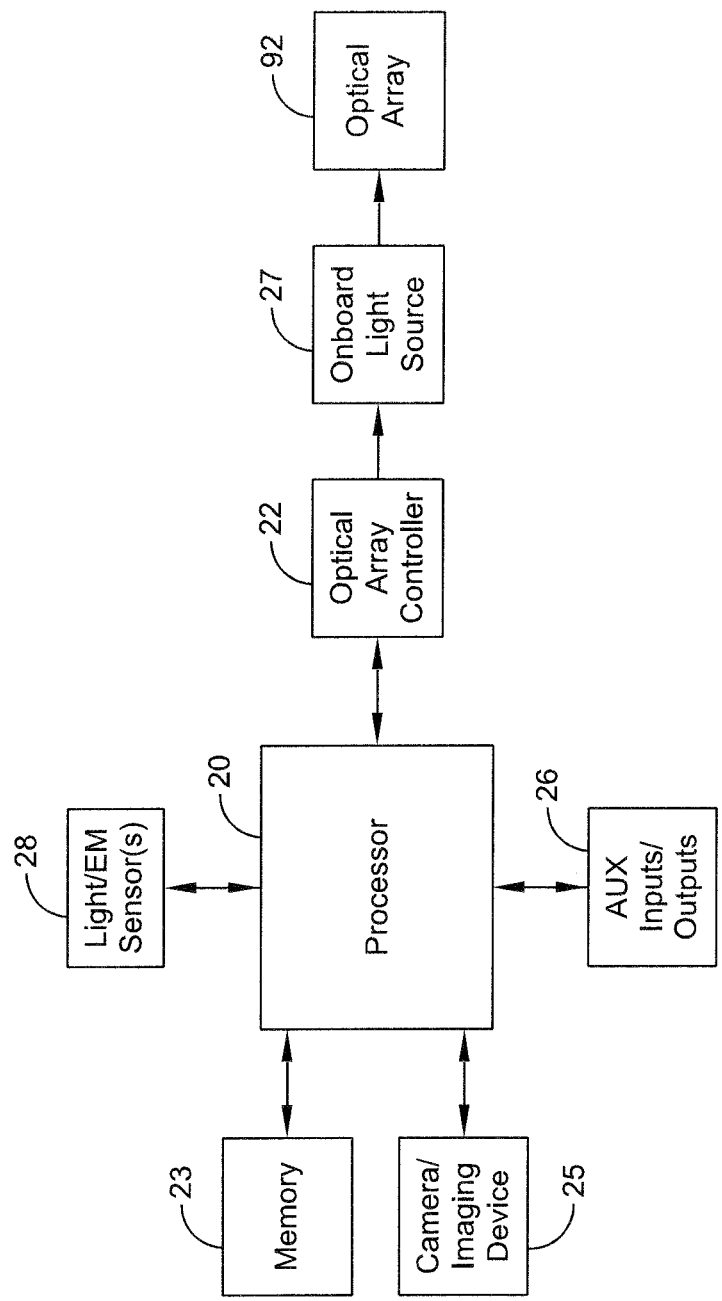
FIG. 12 is a block diagram of an exemplary controller for an active camouflage system according to an embodiment of the present invention.

In either embodiment, optical array 92 is responsive to a control system (FIG. 12) for displaying an image on one or a plurality of segments 90. Referring generally to FIG. 12, in one embodiment of the present invention, the control system may include one or more central processors 20 configured to, for example, interface with system memory 23 and hardware devices (e.g. cameras 25, auxiliary detection systems/user input devices 26). One or more optical array controllers or processors 22 may be provided, responsive to processor 20 to output one or more control signals to selectively power an internal light source 27 (e.g. a plurality of LEDs in communication with respective second ends of the optical fibers), or a light source integrated into optical array 92 (e.g. LEDs embedded in backing material 94). More specifically, controller 22 may operate to control the on/off timing of each of LEDs such that an image is formed from the selective activation of light sources of varying colors. Processor 20 and/or controller 22 may be operative to alter the intensity of the light output by each of the sources by, for example, PWM control of the LEDs. Processor 20 and/or controller 22 may also be responsive to at least one sensor 28 (e.g. a photosensor) for measuring the intensity of the background electromagnetic radiation (e.g. light intensity). Using this information, the intensity of the light source may be adjusted to match the intensity of the background. In this way, embodiments of the present invention may provide accurate image reproduction over a wide range of lighting conditions (e.g. high and low light). Embodiments of the present invention may utilize a plurality of sensors 28 arranged over the entire surface to be camouflaged, further increasing the accuracy of background reproduction.

In one embodiment of the present invention, the control system may access a number of images or schemes stored in system memory 23. For example, image data relating to desert or forest environments may be pre-stored and accessed by processor 20 upon an input selection made by an operator. These environments may also include single-color or tone environments, such as black or dark environments, for providing camouflage in homogenous and/or low-light situations.

Figure 10:
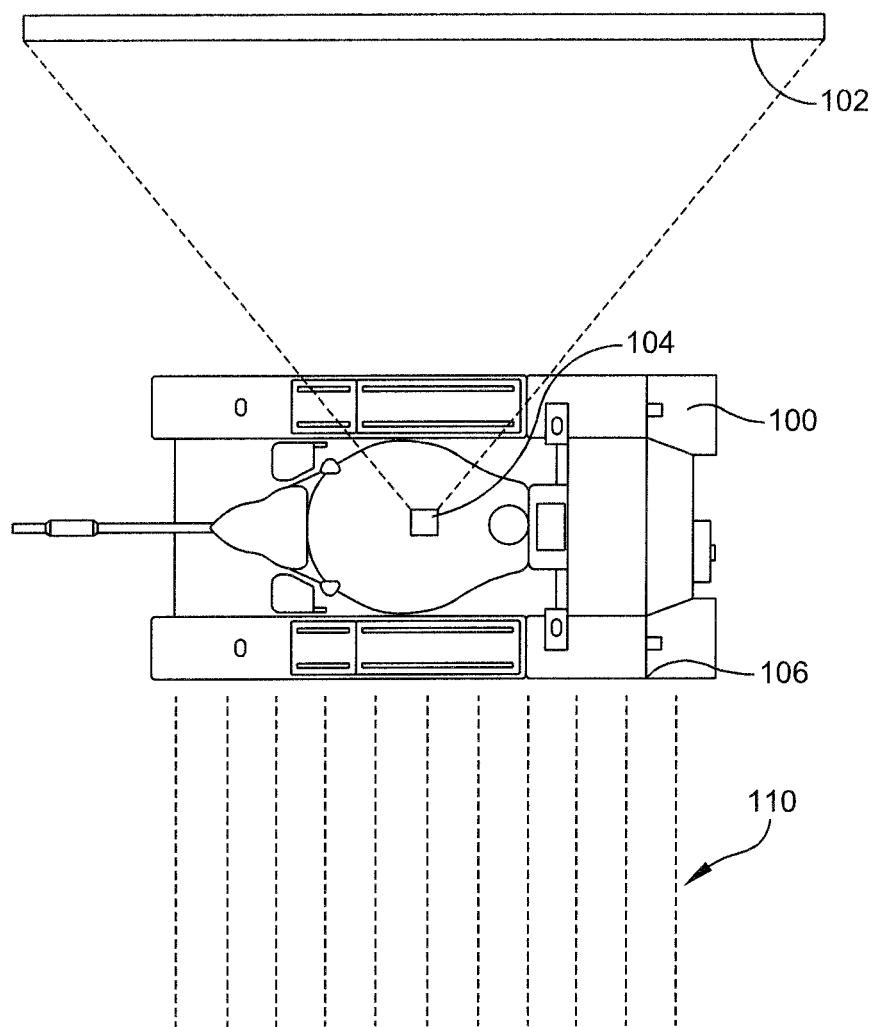
FIGS. 10 and 11 are overhead views illustrating the function of an active camouflage system utilizing various image capturing devices according to embodiments of the present invention.
Figure 11:
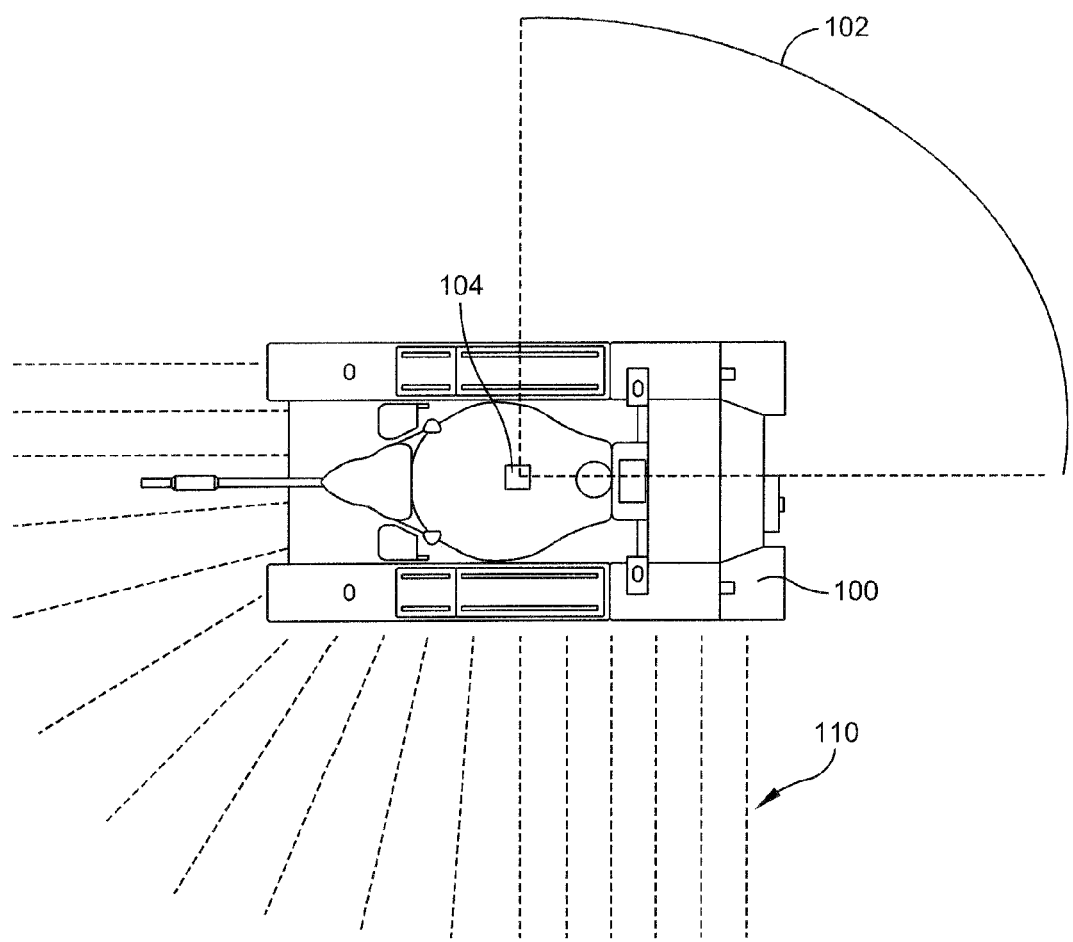

In another embodiment of the present invention, and referring generally to FIGS. 10 and 11, a displayed image 110 may comprise a real-time re-creation of the background environment 102. For example, one or more cameras 104 may be positioned on the asset to be camouflaged 100, in the illustrated embodiment, a military tank. Camera 104 is operative to capture surrounding environment 102. Captured image data may be provided to the above-described control system, wherein image data may be processed and converted into a format suitable for displaying on optical array 106 arranged on a side of asset 100 generally opposite the side facing the background 102. Referring to FIG. 11, multiple cameras 104 (or a single scanning or wide-angle camera) may be used to capture multiple aspects of the background 102 with respect to asset 100. The processing system may be operative to blend and/or merge the image data streams of multiple cameras and/or a moving camera to create a more realistic reproduction of background 102 as a displayed image 110 on asset 100 when viewed from various vantage points. This image capturing, processing, and display cycle may be continuously performed in an automated manner, with the asset displaying 360° of coverage at all times.

In another embodiment of the present invention, the control and processing system may be adapted to receive inputs 26 from an observer-detection system, for example, a motion, radar, or thermal detection system. The observer detection system is operative to provide data corresponding to the location of an observer, or a potential observer, to the display controller, system processor, and/or operator. In this way, the system may utilize information corresponding to the position (e.g. bearing) of an observer to control the operation of the camouflage. More specifically, the controller may be operative to display the background image which would otherwise be observable by the viewer along the detected bearing. In another embodiment of the present invention, an operator may manually control the display. For example, an operator may aim or otherwise input position data into the system corresponding to the location of a known or suspected observer. From the data, the processor and/or controller would output the appropriate background image at the accompanying bearing. In any of these embodiments, combinations of inputs from multiple cameras may be used to re-create the correct background image at a particular viewing bearing.

While embodiments of the present invention are described with respect to a camera and/or stored images operating or associated with the visual spectrum, it is further envisioned that other sensory and emitting devices may be used to capture and re-create any number of physical characteristics. For example, an IR signature of the background environment may be captured and re-created on or projected from a surface of the camouflaged asset. Further still, it is envisioned that various generic signatures (e.g. IR, thermal, etc.) may be stored into memory for later reproduction by the system.

In another embodiment of the present invention, a hybrid system may be implemented which combines the above-described active camouflage system with passive fiber optic filaments configured channel IR and RF energy away from the asset to prevent reflection, further reducing the probability of detection. For the visual spectrum, the fiber optic filaments channel light from another direction, including background/sideground images, for added confusion to the observer. It is further envisioned that the extent the system is operated in a passive, active, or combination mode may be determined by an operator, or automatically by the above-described control system. Selection of the preferred mode of operation may be dictated by any number of characteristics, including operating environment characteristics, power consumption considerations, as well as the type of viewing and/or detection systems targeting the camouflaged asset.

As set forth above with respect to the passive embodiments of the present invention, these active embodiments utilize the super-dark absorption characteristics of the CNT-based backing material in order to, for example, make search radars less effective and reduce the range of fire control radar lock-on, providing aircraft, in particular, high probability of mission success.

It is further envisioned that the CNT-based materials described herein may be used to provide several additional benefits beyond this function as a super-dark absorber. For example, CNTs possess very high tensile strength, as well as a high modulus of elasticity as a result of their covalent bonding between carbon atoms. Accordingly, it is envisioned that these CNT materials may be jointly integrated into, for example, body or vehicle armor systems. Specifically, one embodiment of the present invention includes a combination camouflage and armor system which utilizes a CNT-based material as a super-dark absorber, configured with sufficient thickness and/or density to provide protection against, for example, projectiles, shrapnel and other weapons. In one embodiment of the present invention, such a system may take the form of a garment, such as a "bullet-proof" vest. The camouflage portion of the system may comprise the above-described passive arrangement of optical fibers configured to transfer light from one side of the vest, to the other, reducing the visibility of the wearer, as well as providing threat-protection by virtue of the penetration resistance of the CNT absorber.

It is also envisioned that the advantageous strength characteristics of the CNT material may allow for use as an integral, structural part of the asset. For example, the CNT absorber material may be utilized as all or part of a load-bearing wall in the case of a camouflaged structure. Moreover, in the case of a vehicle, the CNT material may be integrated into the chassis, airframe, or unibody.

As used throughout, the term "LED" should be understood to include any light emitting diode or injection/junction-based system capable of generating radiation in response to an electric signal. The term LED includes, but is not limited to, various semiconductor-based devices that emit light (at varying bandwidths within a given spectrum) in response to current, light emitting polymers, light-emitting strips, and electro-luminescent strips. Further, various light sources may be used in place of LEDs throughout the described embodiments, including, but not limited to incandescent sources, fluorescent sources, phosphorescent sources, high-intensity discharge sources, lasers, and other luminescent sources. A given light source may be configured to generate electromagnetic radiation within the visible spectrum, outside the visible spectrum, or a combination of both.

The terms "processor" or "controller" are used herein interchangeably to describe various devices relating to the operation of one or more light sources and detection equipment. A processor or controller can be implemented in numerous ways, such as with dedicated hardware, using one or more microprocessors that are programmed using software to perform the various functions discussed herein, or as a combination of dedicated hardware to perform certain functions and programmed microprocessors and associated circuitry to perform other functions.

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some configurations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A camouflage material comprising:
an electromagnetic energy (EME) absorbing layer comprising an array of carbon nanotubes, and
at least one energy transmitting element embedded within the absorbing material;
wherein the at least one transmitting element is operative to convey energy from a source to at least a portion of an outer surface of the material.

2. The material of claim 1, wherein the EME absorbing layer comprises an array of generally parallel-aligned carbon nanotubes.

3. The material of claim 2, wherein the carbon nanotubes extend generally axially orthogonal to a plane defined by the absorbing layer.

4. The material of claim 1, wherein the at least one energy transmitting element comprises a plurality of elements.

5. The material of claim 4, wherein the plurality of energy transmitting elements comprise a plurality of optical fibers.

6. The material of claim 5, wherein each of the plurality of optical fibers comprises a first end embedded in a respective first portion of the absorbing layer, and a second end embedded in a respective second portion of absorbing layer.

7. The material of claim 5, wherein each of the plurality of optical fibers comprises a first end embedded in a portion of the absorbing layer, and a second end in communication with the at least one light source.

8. The material of claim 7, wherein the at least one light source comprises a plurality of light-emitting diodes (LEDs).

9. The material of claim 5, wherein the plurality of optical fibers comprise a plurality of optical nanowires.

10. The material of claim 4, wherein the plurality of energy transmitting elements comprise a plurality of conductive nanowires.

11. A camouflage system comprising:
a material configured to be arranged on an exposed surface of an object to be camouflaged, the material comprising an electromagnetic energy (EME) absorbing layer and a plurality of energy transmitting elements;
wherein each of the plurality of energy transmitting elements comprises a first end embedded in a respective first portion of the EME absorbing layer, and a second end embedded in a respective second portion of the EME absorbing layer.

12. The system of claim 11, wherein the plurality of energy transmitting elements comprise a plurality of optical fibers.

13. The system of claim 12, wherein the plurality of optical fibers are operative to transmit light received on a first end thereof to a second end thereof, thereby reducing the ability of an observer to detect the object.

14. The system of claim 13, where the first and second portions of the EME absorbing layer are arranged generally opposite one another with respect to the object to be camouflaged such that the plurality of optical fibers convey EME received on one of the first or second portions to the remaining one of the first or second portions.

15. The system of claim 12, wherein at least one of the optical fibers comprises a prism arranged therein, wherein the prism is configured to reduce the minimum functional bend radius of the optical fiber.

16. A camouflage system comprising:
   a material configured to be arranged on an exposed surface of an object to be camouflaged, the material comprising an electromagnetic energy (EME) absorbing layer and a plurality of energy transmitting elements;
   wherein each of the plurality of energy transmitting elements comprises a first end embedded in a respective first portion of the EME absorbing layer, and a second end in communication with at least one EME source.

17. The system of claim 16, wherein the at least one EME source is operative to generate a visible image, the image projected from a surface of the material via the energy transmitting elements.

18. The system of claim 17, wherein the at least one EME source is configured to generate a pre-determined image stored within the system.

19. The system of claim 17, wherein the at least one EME source is configured to generate an image captured by the system in real-time.

20. The system of claim 16, further comprising a processor for selectively controlling the at least one EME source.

21. The system of claim 16, wherein the at least one EME source comprises a plurality of light-emitting diodes (LEDs).

22. A method of camouflaging an object comprising:
   capturing a portion of at least one of light, infrared, and radio-frequency energy exposed to a first surface of the object;
   absorbing at least another portion of said light, infrared, and radio-frequency energy in a carbon nanotube-based material, and
   projecting at least one of the captured portion of energy or energy representative of the captured portion of energy onto a second surface of the object.

* * * * *